United States Patent [19]

Shibata et al.

[11] Patent Number: 5,142,476

[45] Date of Patent: Aug. 25, 1992

[54] SUSPENSION SYSTEM FOR A VEHICLE

[75] Inventors: Mineharu Shibata, Otake; Shin Tkkehara; Toshiki Morita, both of Higashi-Hiroshima, all of Japan

[73] Assignee: Mazda Motor Corporation, Hiroshima, Japan

[21] Appl. No.: 522,812

[22] Filed: May 14, 1990

[30] Foreign Application Priority Data

May 17, 1989 [JP] Japan ................. 1-124065

[51] Int. Cl.$^5$ ............................................ B60G 17/00
[52] U.S. Cl. ................. 364/424.05; 280/707; 280/840
[58] Field of Search ................. 364/424.05; 188/299; 280/707, 703, 711, 772, 840, DIG. 1

[56] References Cited

U.S. PATENT DOCUMENTS

| | | | |
|---|---|---|---|
| 4,371,182 | 2/1983 | Brown | 280/714 |
| 4,625,993 | 12/1986 | Williams et al. | 280/707 |
| 4,953,890 | 9/1990 | Kamimura | 280/707 |
| 4,978,135 | 12/1990 | Edahiro et al. | 280/707 |
| 5,015,006 | 5/1991 | Takehara et al. | 280/707 |
| 5,037,119 | 8/1991 | Takehara et al. | 280/772 |
| 5,056,812 | 10/1991 | Takehara et al. | 280/840 |
| 5,056,813 | 10/1991 | Shibata et al. | 280/840 |
| 5,060,968 | 10/1991 | Edahiro et al. | 280/707 |
| 5,060,969 | 10/1991 | Kamimura et al. | 280/707 |
| 5,060,970 | 10/1991 | Kamimura et al. | 280/707 |
| 5,062,659 | 11/1991 | Edahiro et al. | 280/711 |

FOREIGN PATENT DOCUMENTS

| | | |
|---|---|---|
| 0114757 | 8/1984 | European Pat. Off. |
| 236947 | 9/1987 | European Pat. Off. |
| 0264944 | 4/1988 | European Pat. Off. |
| 0306004 | 3/1989 | European Pat. Off. |
| 0358231 | 3/1990 | European Pat. Off. |
| 62-96113 | 5/1987 | Japan |
| 1-95927 | 4/1989 | Japan |

Primary Examiner—Gary Chin
Attorney, Agent, or Firm—Fleit, Jacobson, Cohn, Price, Holman & Stern

[57] ABSTRACT

A suspension system for a vehicle has cylinder devices in which suspension characteristics are changed by controlling fluid supply/discharge to/from the cylinder devices. The fluid pressure in the cylinder devices is sensed, and warping of the vehicle body is computed based on the sensed pressures. Then the fluid supply/discharge to/from the cylinder devices is controlled so as to suppress the warping of the vehicle body by a warp control unit. The warp control unit is provided so as to change the ratio of the fluid supply/discharge to/from the cylinder devices of the front wheels to the fluid supply/discharge to/from the cylinder devices of the rear wheels.

5 Claims, 7 Drawing Sheets

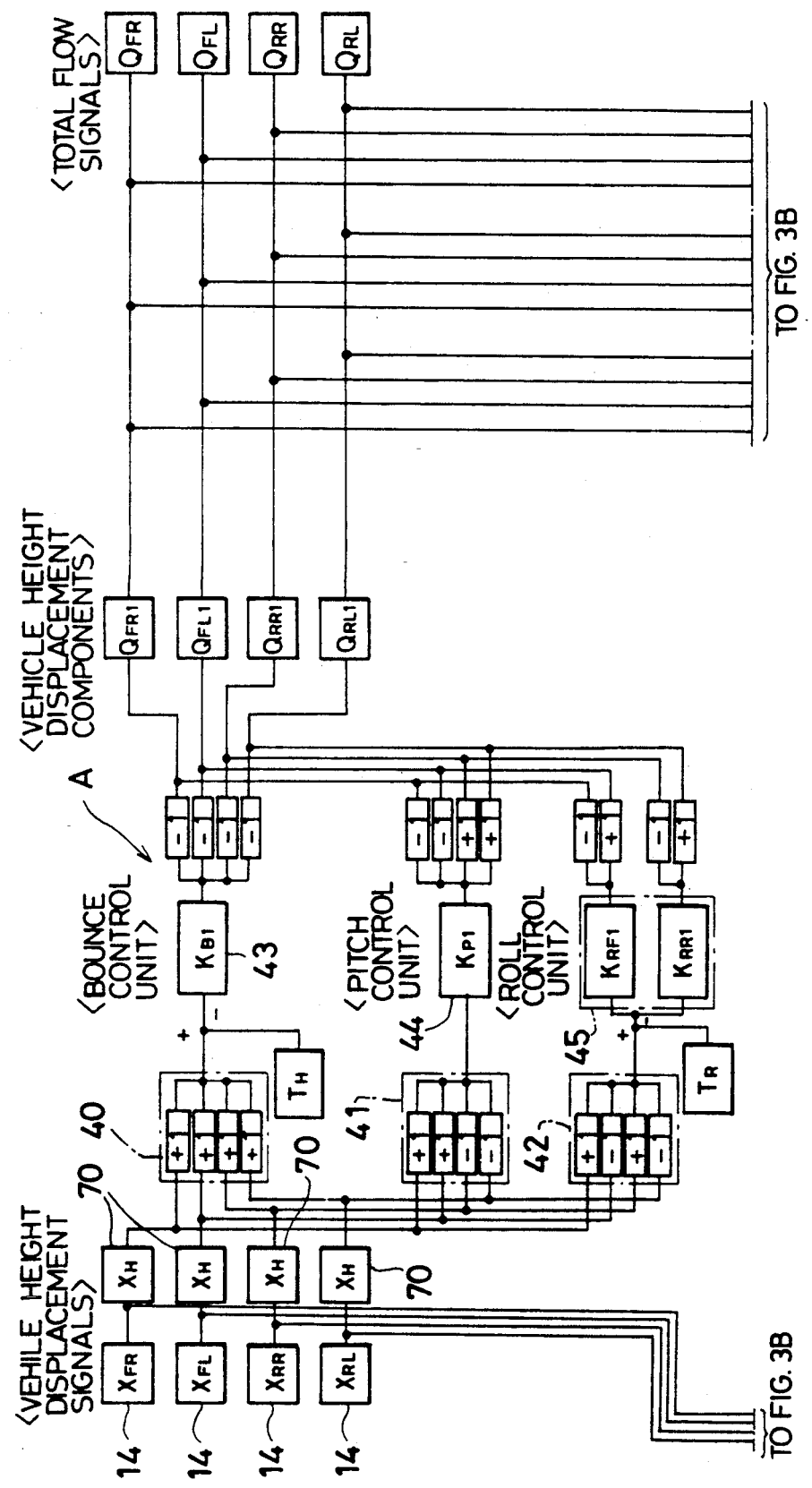

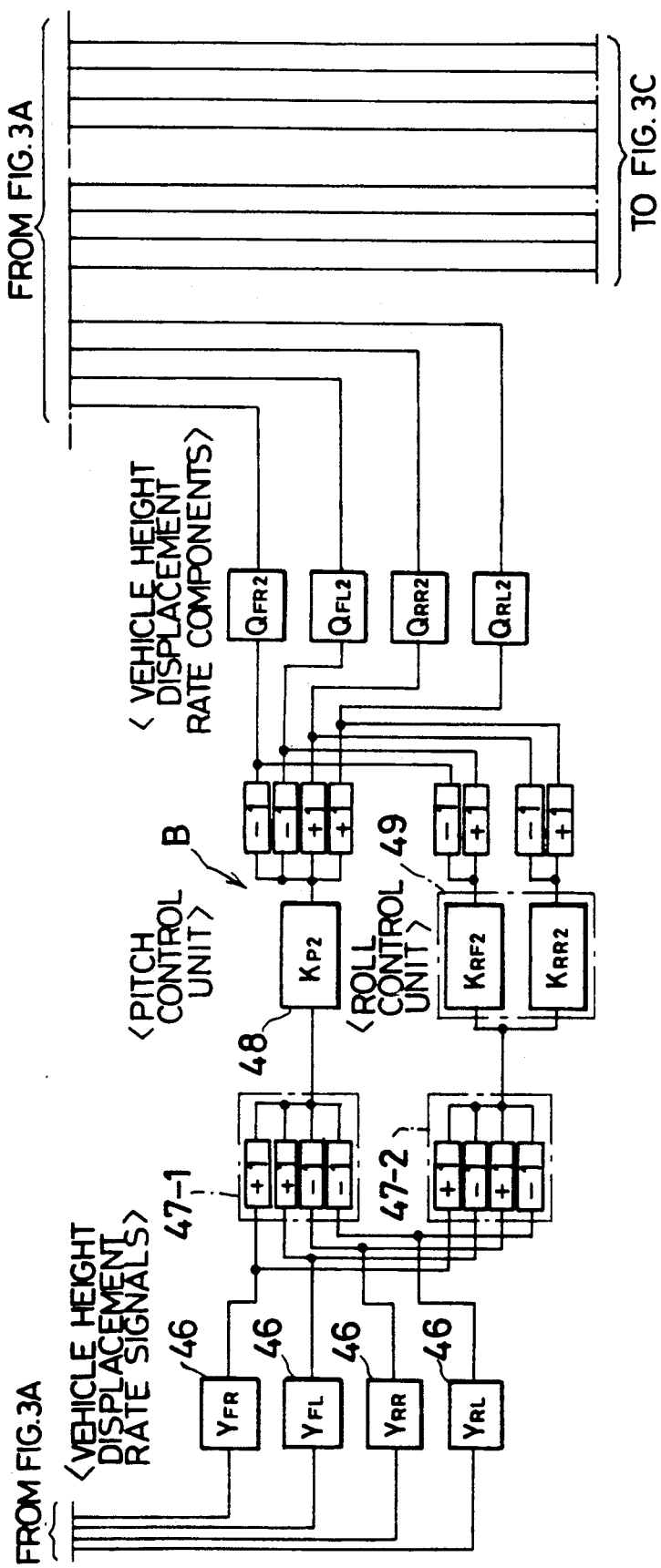

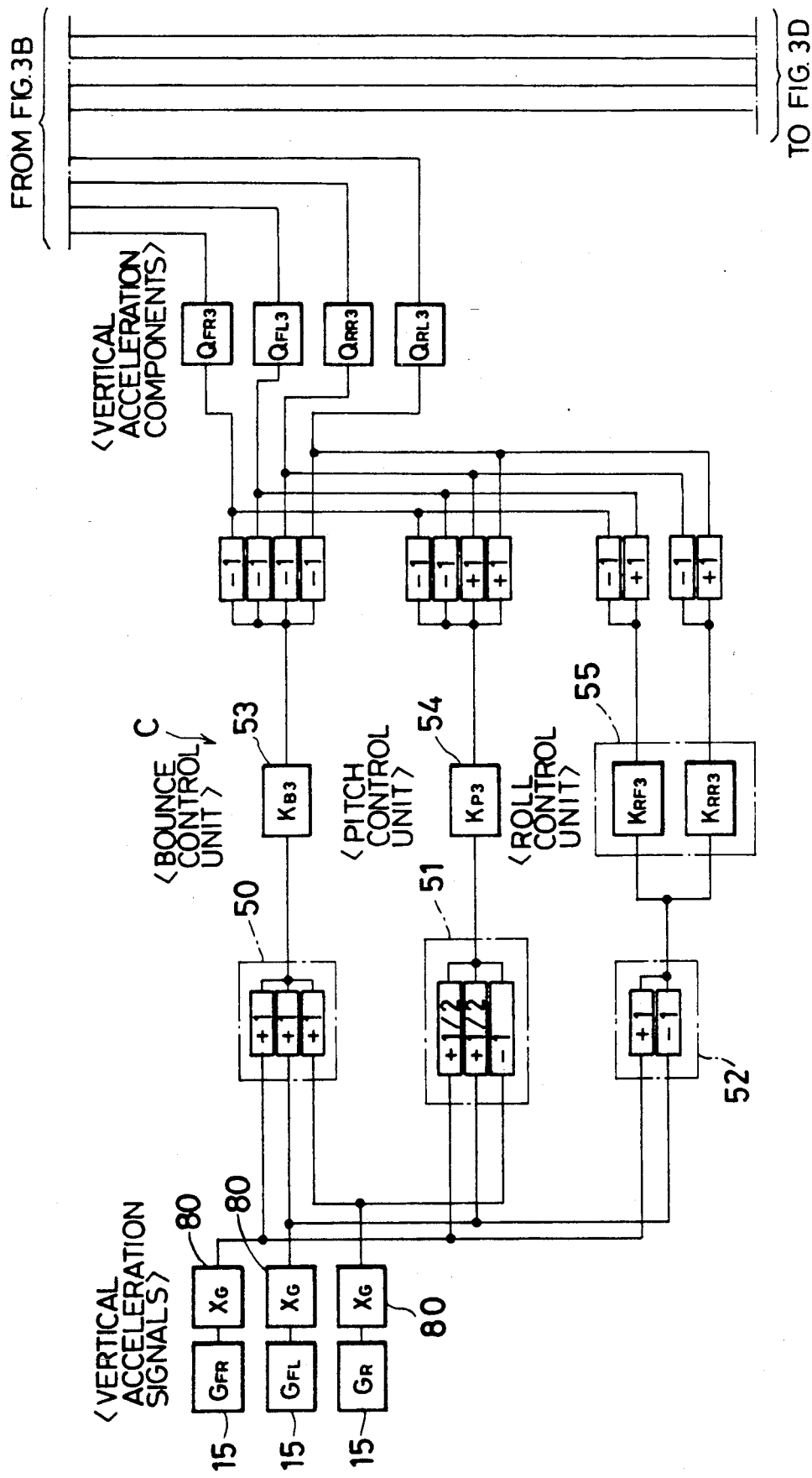

SUSPENSION SYSTEM FOR A VEHICLE

BACKGROUND OF THE INVENTION

1. Field of the Invention

This invention relates to a suspension system for a vehicle, and in particular to an active suspension system.

2. Description of the Related Art

A conventional active suspension system is disclosed in, for example, Japanese Patent Laid-Open No. 62-96113 laid open to the public on May. 2, 1987, European Patent Application laid open to the public on Aug. 1, 1984 under a publication number 0114757 and U.S. Pat. No. 4,371,182 issued on Feb. 1, 1983. In the active suspension as disclosed in the publication enumerated above, a cylinder device is provided for each vehicle wheel member between a vehicle body member and a vehicle wheel member. By controlling the fluid supply/discharge to/from the cylinder device, the fluid in the cylinder device can be changed so that the vehicle suspension characteristics are changed.

In the active suspension system, the fluid pressure of each cylinder device is sensed, and the warping of the vehicle body is computed based on the sensed pressures. Then the fluid supply/discharge to/from the individual cylinder devices is controlled so as to suppress the warping of the vehicle body (hereinafter called warp control).

In the warp control, since the fluid supply/discharge to/from the cylinder devices of the front wheels is as same as that to/from the cylinder devices of the rear wheels, the warp control is not performed suitably under certain vehicle running conditions.

SUMMARY OF THE INVENTION

An object of the invention is to provide a suspension system for a vehicle whereby warp control can be performed suitably.

According to the invention, the above object is achieved by providing a suspension system for a vehicle comprising a plurality of cylinder devices each provided between a vehicle body member and a vehicle wheel member for the vehicle body member, in which suspension characteristics are changed by controlling fluid supply/discharge to/from the cylinder devices, pressure sensor means for sensing fluid pressure in the cylinder devices, and warp control means for computing warping of the vehicle based on fluid pressure signals from the pressure sensor means and controlling the fluid supply/discharge to/from the cylinder devices so as to suppress the warping of the vehicle, the warp control means being provided so as to change a ratio of the fluid supply/discharge to/from the cylinder devices of front wheels to the fluid supply/discharge to/from the cylinder devices of rear wheels.

BRIEF DESCRIPTION OF THE DRAWING

FIGS. 3A through 3D are block diagrams illustrating control of suspension characteristics by a controller.

DESCRIPTION OF THE PREFERRED EMBODIMENT

Figure 1:
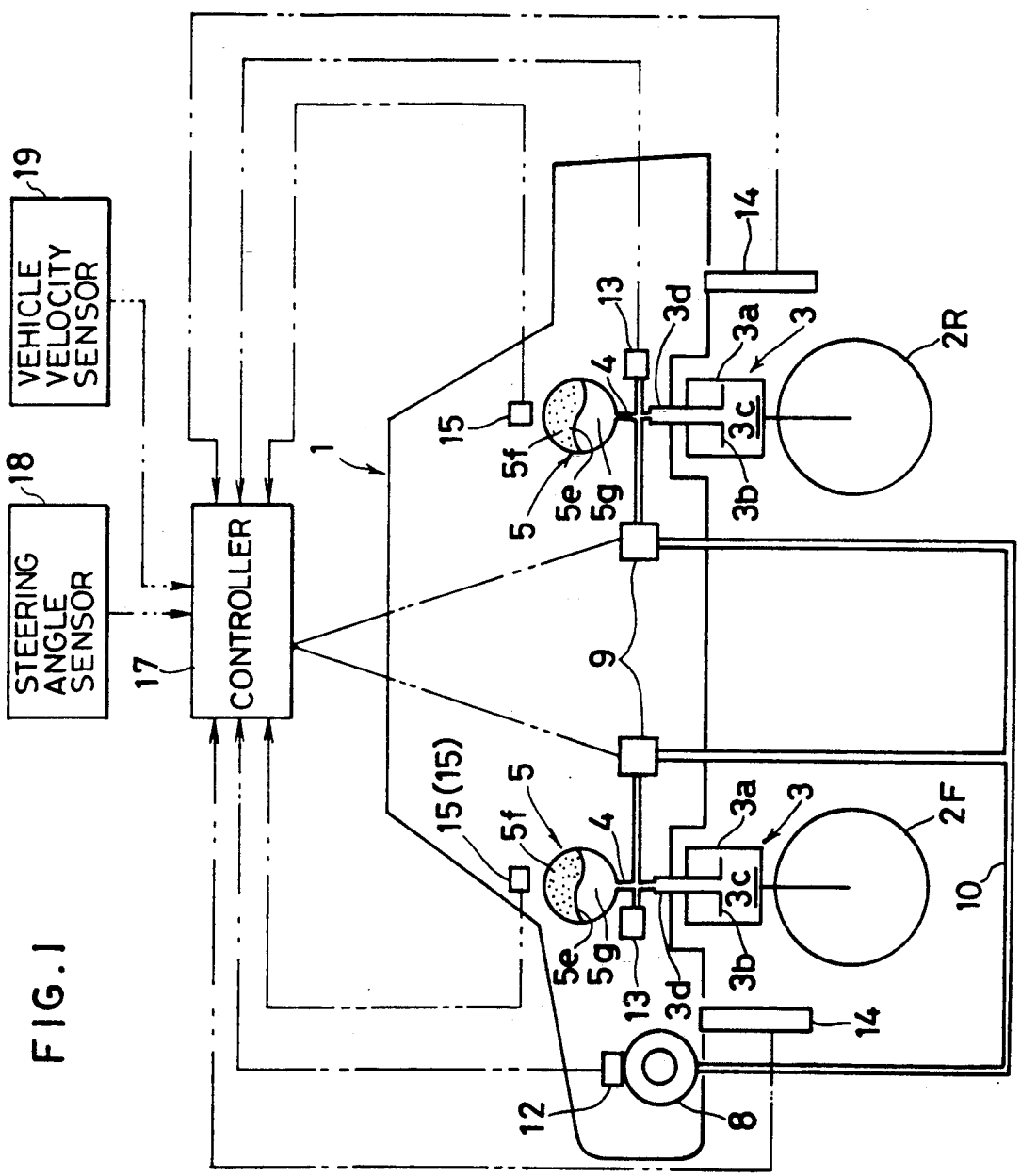
FIG. 1 is an overall schematic view of a vehicle.

FIG. 1 is an overall schematic view of a vehicle according to the invention. In FIG. 1, numeral 1 designates a vehicle body member or a vehicle body, and 2F and 2R respectively designate front and rear vehicle wheel members. Between vehicle body 1 and front wheels 2F, and between vehicle body 1 and rear wheels 2R are provided hydraulic cylinders 3, 3. A piston 3b inserted into each cylinder body 3a defines a fluid pressure chamber 3c inside each hydraulic cylinder 3. The upper end portion of a rod 3d connected to the piston 3b is connected to the vehicle body 1, and cylinder bodies 3a, 3a are connected to vehicle wheels 2F, 2R respectively.

A gas spring 5 is connected to the fluid pressure chamber 3c of each hydraulic cylinder 3 through a communicating path 4. Each gas spring 5 is divided into a gas chamber 5f and a fluid pressure chamber 5g by a diaphragm 5e, and the fluid pressure room 5g is connected to the fluid pressure chamber 3c of the hydraulic cylinder 3 through the communicating path 4 and the piston 3b of the hydraulic cylinder 3.

Numeral 8 designates a hydraulic pump, and numerals 9, 9 designate proportional flow control valves connected to the hydraulic pump 8 through a fluid pressure path 10. These valves function to control fluid supply/discharge to/from the hydraulic cylinders 3, 3.

Numeral 12 designates a discharge pressure gage which senses the discharge pressure of the hydraulic pump 8, and numerals 13, 13 designate fluid pressure sensors which sense the fluid pressure of the fluid pressure chamber 3c in the hydraulic cylinders 3, 3. Numerals 14, 14 designate vehicle height sensors which sense the vehicle height displacement (cylinder stroke length), and numerals 15, 15, 15 designate vertical acceleration sensors which sense the vertical acceleration of the vehicle (spring acceleration of the wheels 2F, 2R). These vertical acceleration sensors 15, 15, 15 are provided one above each of the right and left front wheels 2F within an approximately horizontal plane, and one at the center of the vehicle in the widthwise direction between the rear wheels 2R. Namely, a total of three vertical acceleration sensors are provided.

Numerals 18, 19 designate a steering angle sensor and a vehicle speed sensor, respectively.

The signals from the above mentioned sensors are input to a controller 17 constituted of CPU (central processing unit) and the like, which controls the proportional flow control valves 9, 9 so as to change the suspension characteristics.

Figure 2:
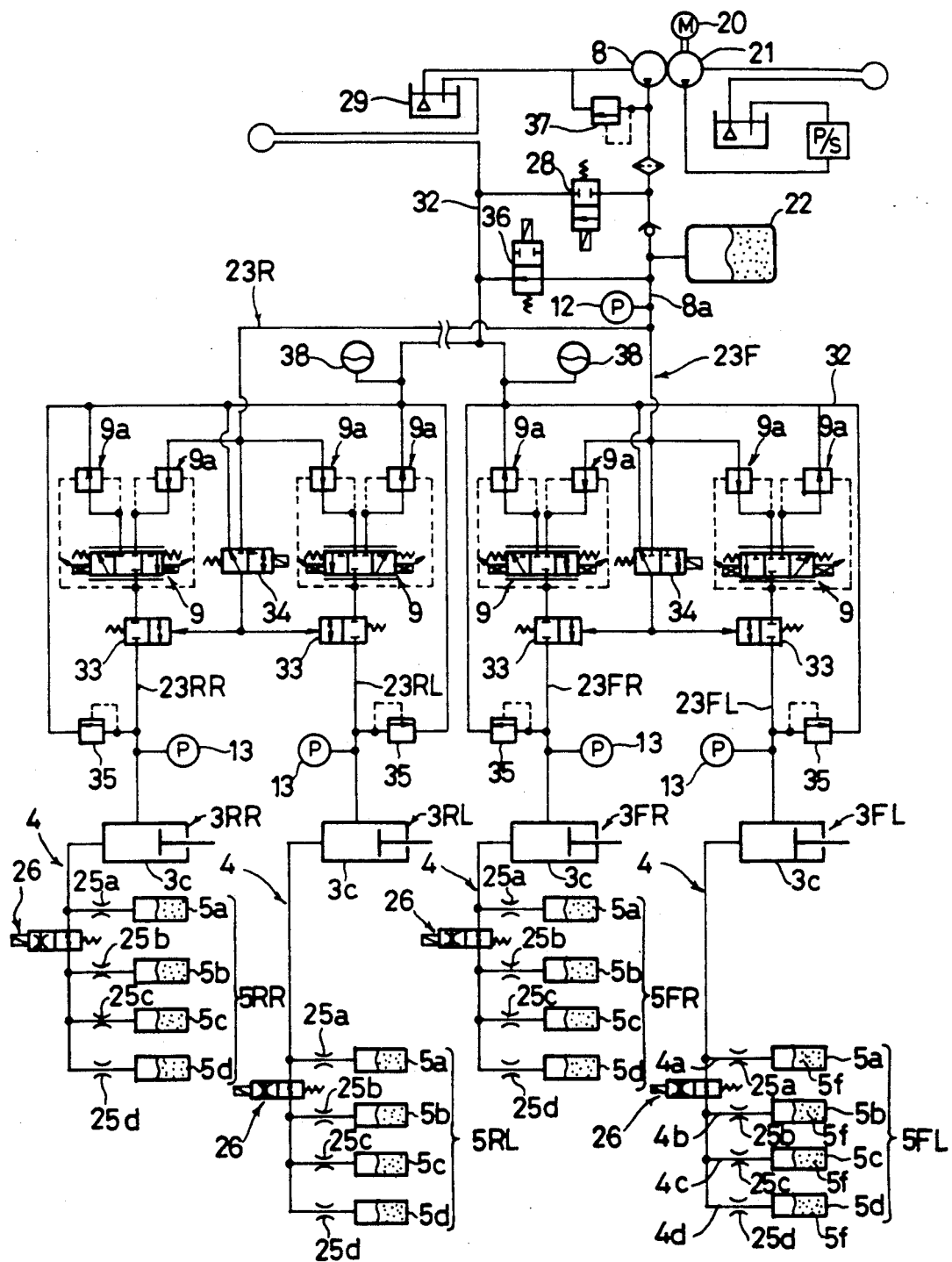
FIG. 2 is a circuit diagram of a hydraulic system for controlling fluid supply/discharge to/from hydraulic cylinder devices.

FIG. 2 shows a hydraulic circuit for supplying and discharging fluid to/from the hydraulic cylinders 3.

As seen in FIG. 2, the hydraulic pump 8 is connected in tandem with a hydraulic pump 21 driven by a driving motor 20 for a power steering device. A discharge tube 8a has an accumulator 22 connected with an intermediate portion thereof and a downstream portion of the discharge tube 8a branches off into a front wheel tube 23F and a rear wheel tube 23R. The front wheel tube 23F branches off into a left front wheel tube 23FL and a right front wheel tube 23FR, the downstream ends of which are connected with the fluid pressure chambers 3c, 3c of the hydraulic cylinders 3FL, 3FR.

In a similar manner, the rear wheel tube 23R branches off into a left wheel tube 23RL and a right wheel tube 23RR, the downstream ends of which are connected with the fluid pressure chambers 3c, 3c of the hydraulic cylinders 3RL, 3RR.

The gas spring devices 5FL through 5RR connected with the hydraulic cylinders 3FL through 3RR each has a plurality (four) of gas springs 5a, 5b, 5c, 5d which are connected through branch communicating paths 4a through 4d to a common communicating path 4 connected with the fluid pressure chamber 3c of the corresponding hydraulic cylinder 3. The branch communicating paths 4a through 4d of the plurality (first through fourth) gas springs 5a through 5d of each wheel have orifices 25a through 25d. The damping action by the orifices 25a through 25d and the buffer action of gas charged in the gas chambers 5f combine to provide the basic function as a suspension system.

In the gas springs 5FL through 5RR of each vehicle wheel, a damping force switching valve 26 which switches the damping force by adjusting the path area of the communicating path 4 is provided on the common communicating path 4 between the first gas spring 5a and the second gas spring gas spring 5b. The switching valve 26 has two positions: an open position (shown in FIG. 2) opening the common communicating path 4 and a throttle position throttling the area of the common communicating path 4.

The discharge tube 8a of the hydraulic pump 8 has an unloader relief valve 28 with an open position and a closed position (shown in FIG. 2) connected near the accumulator 22. When the discharged fluid pressure measured by the discharge pressure gage 12 is more than or equal to a preset upper limit value, the relief valve 28 is switched from the closed position shown in FIG. 2 to the open position, so the fluid in the hydraulic pump 8 is returned directly to a reserve tank 29, whereby the fluid accumulation pressure in the accumulator 22 is controlled to be maintained at a preset value. In above mentioned manner, the accumulated fluid of preset pressure from the accumulator 22 is supplied to the hydraulic cylinders 3.

As the left front wheel, the right front wheel, the left rear wheel and the right rear wheel are identical in configurations, only the left front wheel will be described in the following.

As explained above, the left front wheel tube 23FL is provided with the proportional flow control valve 9 which has three positions: a stopping position closing all ports (shown in FIG. 2), a supplying position where the left front wheel tube 23FL is opened to the supplying side, and a discharge portion where the hydraulic cylinder 3 of the left front wheel tube 23FL is connected through a return tube 32. The proportional flow control valve 9 is further provided with pressure-compensated valves 9a, 9a. The pressure-compensated valves 9a, 9a maintain the fluid pressure in the fluid pressure chamber 3c at a preset valve when the proportional flow control valve 9 is positioned at either the supplying position or the discharge position.

On the hydraulic cylinder 3 side portion of the proportional flow control valve 9 is provided a pilot pressure active type switching valve 33 which opens and closes the left front tube 23FL. When a solenoid controlled valve 34 which introduces the pressurized fluid in the left front wheel tube 23F is at the open position, the fluid pressure of the solenoid controlled valve 34 is introduced as a pilot pressure to the switching valve 34. When the pilot pressure is more than or equal to a predetermined value, the switching valve 33 operates to open the left front wheel tube 23FL, so that the proportional flow control valve 9 can control the flow to the hydraulic cylinder 3.

The numeral 35 designates a relief valve which opens and operates to return fluid in the fluid pressure chamber 3c of the hydraulic cylinder 3 to the return tube 32 when the fluid pressure of the fluid pressure chamber 3c rises abnormally. The numeral 36 designates an ignition switch interlock valve connected near the accumulator 22 on the discharge tube 8c of the hydraulic pump 8. When the ignition switch is at off position, the interlock valve 36 is controlled to open (shown in FIG. 2) so as to return the fluid in the accumulator 22 to the tank 29 and relieve the high pressure condition of the fluid. The numeral 37 designates a relief valve which returns fluid to the tank 29 and lowers the fluid pressure when the discharge pressure of the hydraulic pump 8 rises abnormally. The numerals 38, 38 designates return accumulators connected to the return tube 32 for accumulating the fluid discharged from the hydraulic cylinder 3.

Figure 3D:
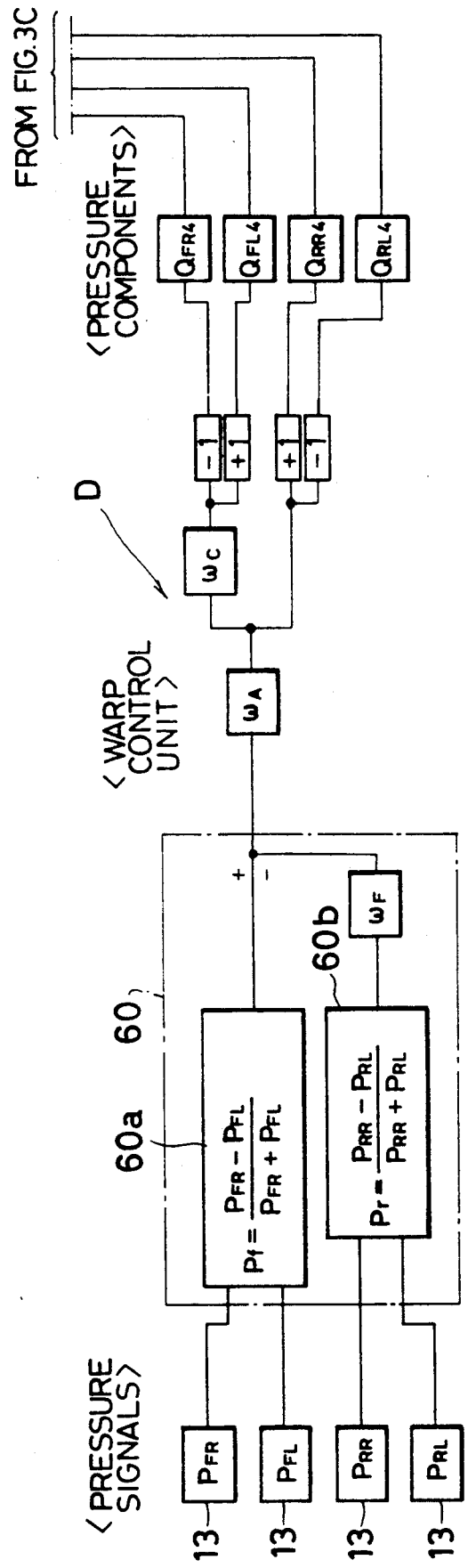

FIG. 3 is a block diagram illustrating control of suspension characteristics by a controller 17.

FIG. 3 shows a control system A for controlling the vehicle height to a desired value based on vehicle height displacement signals $X_{FR}$, $X_{FL}$, $X_{RR}$, $X_{RL}$ from the vehicle height sensors 14, 14, 14, 14 of the vehicle wheels, a control system B for suppressing vehicle height displacement rates based on the vehicle height displacement rate signals $Y_{FR}$, $Y_{FL}$, $Y_{RR}$, $Y_{RL}$ obtained from the vehicle height displacement signals, a control system C for lowering vertical vibration of the vehicle based on vertical acceleration signals $G_{FR}$, $G_{FL}$, $G_R$ of the three vertical acceleration sensors 15, 15, 15, and a control system D for supressing vehicle body warping computed from pressure signals $P_{FR}$, $P_{FL}$, $P_{RR}$, $P_{RL}$ of the fluid pressure sensors 13, 13, 13, 13 of the vehicle wheels.

First, in the control system A, numeral 40 designates a bounce component arithmetic unit which computes the vehicle bounce components by summing not only the outputs $X_{FR}$, $X_{FL}$ of the right and left front wheels 2F but also the outputs $X_{RR}$, $X_{RL}$ of the right and left rear wheels 2R from the vehicle height sensors 14, 14, 14, 14. Numeral 41 designates a pitch component arithmetic unit which computes the vehicle pitch components by subtracting the summed outputs $X_{RR}$, $X_{RL}$ of the right and left rear wheels 2R from summed outputs $X_{FR}$, $X_{FL}$ of the right and left front wheels 2F. Numeral 42 designates a roll component arithmetic unit which computes vehicle roll components by summing the difference $X_{FR} - X_{FL}$ of the outputs of the right and left front wheels 2F and the difference $X_{RR} - X_{RL}$ of the outputs of the right and left rear wheels 2R. Numeral 43 designates a bounce control unit which is input the vehicle bounce component computed in the bounce component arithmetic unit 40 and a desired average vehicle height $T_H$, and which computes controlled variables of the proportional flow control valves 9, 9, 9, 9 based on a gain coefficient $K_{B1}$ under bounce control. Numeral 44 designates a pitch control unit to which is input vehicle pitch components computed in the pitch component arithmetic unit 41 and which computes controlled variables of the proportional flow control valves 9, 9, 9, 9 based on a gain coefficient $K_{P1}$ under pitch control. Numeral 45 designates a roll control unit to which is input vehicle roll components computed in the roll component arithmetic unit 42 and a desired roll displacement $T_R$, and which computes controlled variables of the proportional flow control valves 9, 9, 9, 9 based on gain coefficients $K_{RF1}$, $K_{RR1}$ under roll control so as to level vehicle height corresponding to the desired roll displacement $T_R$.

For the purpose of controlling vehicle height to the desired value, the controlled variables computed in the above mentioned control units 43, 44, 45 are reversed with respect to the signs of the vehicle height displacement signals of vehicle height sensors 14, 14, 14, 14. After that, each controlled bounce, pitch and roll variables for the vehicle wheels are added and flow signals $Q_{FR1}$, $Q_{FL1}$, $Q_{RR1}$, $Q_{RL1}$ of corresponding proportional flow control valves 9, 9, 9, 9 are obtained in the control system A.

Between the vehicle height sensors 14, 14, 14, 14 and the arithmetic units 40, 41, 42 are provided dead zone devices 70, 70, 70, 70, which output their vehicle height displacement signals $X_{FR}$, $X_{FL}$, $X_{RR}$, $X_{RL}$ only when the vehicle height displacement signals $X_{FR}$, $X_{FL}$, $X_{RR}$, $X_{RL}$ from the vehicle height sensors 14, 14, 14, 14 exceed the preset dead zone $X_H$.

Next in the control system B, vehicle height displacement signals $X_{FR}$, $X_{FL}$, $X_{RR}$, $X_{RL}$ from the vehicle height sensors 14, 14, 14, 14, are input to differentiators 46, 46, 46, 46, by which differential components of the vehicle height displacement signals $X_{FR}$, $X_{FL}$, $X_{RR}$, $X_{RL}$, or vehicle height displacement rate signals $Y_{FR}$, $Y_{FL}$, $Y_{RR}$, $Y_{RL}$ are obtained.

Here, the vehicle height displacement rate is obtained by the following equation.

$$Y = (X_n - X_{n-1})/T$$

$X_n$: vehicle height at time t
$X_{n-1}$: vehicle height at time $t-1$
T: sampling time Numeral 47-1 designates a pitch component arithmetic unit which computes the vehicle pitch elements by subtracting the summation of the outputs $Y_{RR}$, $Y_{RL}$ of the right and left rear wheels 2R from summation of the outputs $Y_{FR}$, $Y_{FL}$ of the right and left front wheels 2F. Numeral 47-2 designates a roll element arithmetic unit which computes vehicle roll components by summing differences $Y_{FR} - Y_{FL}$ of the outputs of the right and left front wheels 2F and the difference $Y_{RR} - Y_{RL}$ of the outputs of the right and left rear wheels 2R.

Further numeral 48 designates a pitch control unit to which is input the vehicle pitch component computed in the pitch component arithmetic unit 47-1, and which computes controlled variables for the proportional flow control valves 9, 9, 9, 9 based on a gain coefficient $K_{P2}$ under pitch control. Numeral 49 designates a roll control unit which is input vehicle roll components computed in the roll component arithmetic unit 47-2, and which computes controlled variables for the proportional flow control valves 9, 9, 9, 9 based on gain coefficients $K_{RF2}$, $K_{RR2}$ under roll control.

Thus, each controlled variable computed in the above mentioned control units 48, 49 is reversed with respect to the signs of vehicle height displacement rate signals of the differentiators 46, 46, 46, 46. After that, the controlled pitch and roll variables of the vehicle wheels are added, and flow signals $Q_{FR2}$, $Q_{FL2}$, $Q_{RR2}$, $Q_{RL2}$ for the corresponding proportional flow control valves 9, 9, 9, 9 are obtained in the control system B.

Next in the control system C, numeral 50 designates a bounce component arithmetic unit which computes the vehicle bounce components by summing the outputs $G_{FR}$, $G_{FL}$, $G_R$ of the three vertical acceleration sensors 15, 15, 15. Numeral 51 designates a pitch component arithmetic unit which computes vehicle pitch components by subtracting the output $G_R$ of the rear wheel 2R from the summation of each half-value of outputs $G_{FR}$, $G_{FL}$ of the right and left front wheels 2F in the three vertical acceleration sensors 15, 15, 15. Numeral 52 designates a roll component arithmetic unit which computes vehicle roll components by subtracting the output $G_{FL}$ of the left front wheel from output $G_{FR}$ of the right front wheel.

Further, numeral 53 designates a bounce control unit to which is input vehicle bounce components computed in the bounce component arithmetic unit 50, and which computes controlled variables for the proportional flow control valves 9, 9, 9, 9 of the wheels based on a gain coefficient $K_{B3}$ under bounce control. Numeral 54 designates a pitch control unit to which is input vehicle pitch components computed in the pitch component arithmetic unit 51, and which computes controlled variables for the proportional flow control valves 9, 9, 9, 9 based on a gain coefficient $K_{P3}$ under pitch control. Numeral 55 designates a roll control unit to which is input vehicle roll components computed in the roll component arithmetic unit 52, and which computes controlled variables for the proportional flow control valves 9, 9, 9, 9 based on gain coefficients $K_{RF3}$, $K_{RR3}$ under roll control.

For the purpose of suppressing vehicle vertical vibration by the bounce components, pitch components and roll components controlled variables in above mentioned control units 53, 54, 55 are reversed in sign in every wheel, and after that, each controlled bounce, pitch and roll variable in each vehicle wheel is added and flow signals $Q_{FR3}$, $Q_{FL3}$, $Q_{RR3}$, $Q_{RL3}$ for corresponding proportional flow control valves 9, 9, 9, 9 are obtained in the control system C.

Between the vertical acceleration sensors 15, 15, 15 and the arithmetic units 50, 51, 52 are provided dead zone devices 80, 80, 80, which output their vertical acceleration signals $G_{FR}$, $G_{FL}$, $G_R$ only when the vertical acceleration signals $G_{FR}$, $G_{FL}$, $G_R$ from the vertical acceleration sensors 15, 15, 15 exceed preset dead zone $X_G$.

Next in the control system D, a warp control unit 60 includes a fluid pressure ratio arithmetic unit 60a of the front wheel to which is input fluid pressure signals $P_{FR}$, $P_{FL}$ of the two fluid pressure sensors 13, 13 of the front wheels and computes the ratio $(R_{FR} - P_{FL})/(P_{FR} + P_{FL})$ of the right and left front wheel pressure difference $(P_{FR} - P_{FL})$ to the front wheel total fluid pressure $(P_{FR} + P_{FL})$, and a fluid pressure ratio arithmetic unit 60b of the rear wheel which similarily computes the fluid pressure ratio $(P_{RR} - P_{RL})/(P_{RR} + P_{RL})$ of the rear wheel. Then after the fluid pressure ratio of the rear wheel is multiplied by a gain coefficient $W_F$, the multiplied value is subtracted from the fluid pressure ratio of the front wheel, thus the subtracted value is multiplied by a gain coefficient $W_A$ and moreover is multiplied by a gain coefficient $W_C$ in the front wheel. After that, controlled variables for the wheels are reversed in sign for the purpose of being equalized between right and left wheels, so that flow signals $Q_{FR4}$, $Q_{RL4}$, $Q_{RR4}$, $Q_{RL4}$ of corresponding proportional flow control valves 9, 9, 9, 9 are obtained.

Thus, finally total flow signals $Q_{FR}$, $Q_{FL}$, $Q_{RR}$, $Q_{RL}$ are obtained by summing vehicle height displacement components $Q_{FR1}$, $Q_{FL1}$, $Q_{RR1}$, $Q_{RL1}$, vehicle height displacement rate components $Q_{FR2}$, $Q_{FL2}$, $Q_{RR2}$, $Q_{RL\ 2}$, vertical acceleration components $Q_{FR\ 3}$, $Q_{FL\ 3}$, $Q_{RR\ 3}$, $Q_{RL\ 3}$ and pressure components $Q_{FR\ 4}$, $Q_{FL\ 4}$, $Q_{RR\ 4}$, $Q_{RL\ 4}$ finally.

In the vehicle suspension system in accordance with the embodiment of the invention, the gain coefficient $W_c$ in the control system D shown in FIG. 3 can be changed. Namely, the ratio of the fluid supply/discharge ($Q_{F\ R4}$, $Q_{FL\ 4}$) to/from the cylinder devices of the front wheels to the fluid supply/discharge ($Q_{RR\ 4}$, $Q_{RL\ 4}$) to/from the cylinder devices of the rear wheels can be changed.

In the embodiment, for example, the gain coefficient $W_c$ can be decreased, namely the fluid supply/discharge ($Q_{F\ R4}$, $Q_{FL\ 4}$) to/from the cylinder devices of the front wheels can be made less than the fluid supply/discharge ($Q_{RR\ 4}$, $Q_{R\ L4}$) to/from the cylinder devices of the rear wheels. Thus when the gain coefficient $W_c$ is decreased, and the vehicle is steered with a hight lateral acceleration, the warp control is performed not in the front wheels but in the rear wheels of the vehicle, so that large attitude change in the front wheels of the vehicle does not occur. The fact no large change occurs in the attitude of the front wheels means that the vehicle driver, whose eyes are directed toward the front wheel end of the vehicle, will be saved from any feeling of fright. There is a great advantage in this in comparision with the case where a driver caused to feel fright because of the occurrence of a large attitude change in the front wheels when the warp control is performed in the front wheels. Thus, the warp control can be performed in the rear wheels, with little adverse effect, by means of having the gain coefficient $W_c$ decreased.

Figure 4:
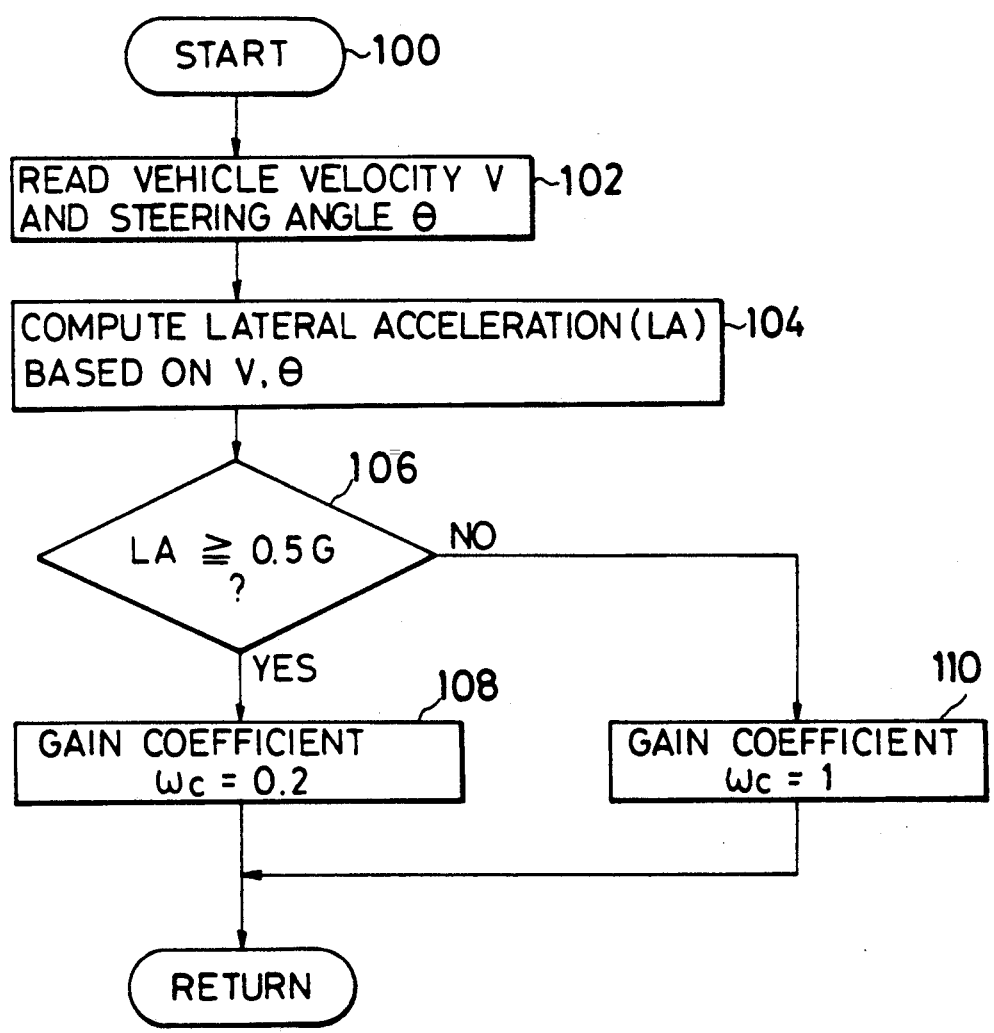
FIG. 4 is a flow chart of the operation of a suspension system for a vehicle according to an embodiment of the invention.

Also, in the embodiment, the fluid supply/discharge ($Q_{RR\ 4}$, $Q_{RL\ 4}$) to/from the cylinder devices in the rear wheels can be increased according to increase in the lateral acceleration by means of having the gain coefficient $W_c$ decreased. This setting of the gain coefficient $W_c$ is shown in the flow chart in FIG. 4. In FIG. 4, the procedure starts in step 100, reads the vehicle velocity V and the steering angle $\theta$ in step 102, and computes the lateral acceleration (LA) in step 104 based on the velocity V and the steering angle $\theta$. In step 106, when the lateral acceleration is more than or equal to 0.5 G (the high lateral acceleration region), the procedure advances to step 108, where the gain coefficient $W_c$ is set to 0.2. On the other hand, in step 106, when the lateral acceleration is less than 0.5 G (low and intermediate lateral acceleration region), the procedure advances to step 110, where the gain coefficient $W_c$ is set to 1.

When the lateral acceleration is small, the gain coefficient $W_c$ is set to 1, so that the warp control is performed in both the front and rear wheels of the vehicle body, whereby the attitude change occurs even on the front-wheel side. However since steering angle of the vehicle is not large, the driver does not experience fright. Moreover since the warp control is performed in both the front and rear wheels of the vehicle body, the steering characteristics can be optimized quickly.

On the other hand, when the lateral acceleration is large, the gain coefficient $W_c$ is decreased and set to 0.2. By means of having the gain coefficient $W_c$ decreased, in the above-mentioned manner, the warp control is performed in the rear wheels of the vehicle body, so that no large attitude change occurs in the front wheel side, whereby the driver does not experience fright. Since the front-wheel side is generally heavier than the rear-wheel side, the higher the lateral acceleration of the vehicle becomes, the more the under-steering characteristics are increased (stable characteristics). As a result, the steering characteristics are not affected even if the warp control is performed in the rear wheels and there is a delay in the warp control.

In the embodiment, the gain coefficient $W_c$ can be changed according to the weight balance of the vehicle body, namely the ratio of the fluid supply/discharge ($Q_{F\ R4}$, $Q_{FL\ 4}$) to/from the cylinder devices of the front wheels to the fluid supply/discharge ($Q_{R\ R4}$, $Q_{RL\ 4}$) to/from the cylinder devices of the rear wheels can be changed. In the vehicle body, the ratio of the weight of the front-wheel side to that of the rear-wheel side is seldom 1:1, so that the weight on one side is higher than that on the other side, and in normal cases the weight of the front-wheel side is higher than that of the rear-wheel side. Therefore when the weight of the front-wheel is higher than that of the rear-wheel side, the gain coefficient $W_c$ is increased so that the fluid supply/discharge ($Q_{F\ R4}$, $Q_{F\ L4}$) to/from the front wheels is more than the fluid supply/discharge ($Q_{RR\ 4}$, $Q_{R\ L4}$) to/from the rear wheels. On the contrary, when the weight of the front-wheel side is lower than that of the rear-wheel side, the gain coefficient $W_c$ is decreased so that the fluid supply/discharge ($Q_{F\ R4}$, $Q_{FL\ 4}$) to/from the front wheels is less than the fluid supply/discharge ($Q_{R\ R4}$, $Q_{RL\ 4}$) to/from the rear wheels.

The case in which the weight of the front-wheel side is higher than that of the rear-wheel side will be considered by way of example. Suppose the fluid supply/discharge ($Q_{F\ R4}$, $Q_{FL\ 4}$) to/from the front wheels is as same as the fluid supply/discharge ($Q_{RR\ 4}$, $Q_{R\ L4}$) to/from the rear wheels, in such case, the pressure fluctuation is small in the front wheels and large in the rear wheels, so that it takes a long time to rectify the warping of the vehicle. In the embodiment, however, since the gain coefficient $W_c$ is changed according to the weight balance of the vehicle body so that the ratio of the fluid supply/discharge ($Q_{F\ R4}$, $Q_{FL\ 4}$) to/from the front wheels to the fluid supply/discharge ($Q_{R\ R4}$, $Q_{RL\ 4}$) to/from the rear wheels is changed, the warp control is performed suitable and quickly according to the weight balance of the vehicle body.

Furthermore, in the embodiment of the invention, under normal conditions, the gain coefficient $W_c$ is changed according to the weight balance of the vehicle body so that the ratio of the fluid supply/discharge ($Q_{F\ R4}$, $Q_{FL\ 4}$) to/from the front wheels to the fluid supply/-discharge ($Q_{R\ R4}$, $Q_{RL\ 4}$) to/from the rear wheels is changed, and further the gain coefficient $W_c$ is decreased according to increase in the lateral acceleration so that the ratio of the fluid supply/discharge ($Q_{FR\ 4}$, $Q_{F\ L4}$) to/from the front wheels to the fluid supply/discharge ($Q_{RR\ 4}$, $Q_{R\ L4}$) to/from the rear wheels is decreased.

Thus since the gain coefficient $W_c$ is changed according to the weight balance of the vehicle body, the warp control is performed suitably and quickly, and the steering characteristics are controlled optimally because of the above-mentioned reasons. On the other hand, since the gain coefficient is decreased according to increase in the lateral acceleration, the warp control is performed in the rear wheels and no large atitude occurs on the front-wheel side, so that the driver does not experience fright.

What is claimed is:

1. A suspension system for a vehicle, comprising a plurality of cylinder devices each provided between a vehicle body member and a vehicle wheel member for the vehicle body, in which suspension characteristics are changed by controlling fluid supply to and discharge from said cylinder devices, pressure sensor means for sensing fluid pressure in said cylinder devices, and warp control means for computing warping of said vehicle based on fluid pressure signals from said pressure sensor means and controlling the fluid supply/discharge to/from said cylinder devices so as to suppress said warping of the vehicle, said warp control means being provided so as to change a ratio of the fluid supply to or discharge from the cylinder devices of front wheels to the fluid supply to or discharge from the cylinder devices of rear wheels based on the computed warping.

2. The suspension system according to claim 1 wherein said warp control means controls the fluid supply to and discharge from the cylinder devices of the front wheels to be less than the fluid supply to and discharge from the cylinder devices of the rear wheels.

3. The suspension system according to claim 1 wherein said warp control means changes said ratio so as to be decreased according to increase in lateral acceleration.

4. The suspension system according to claim 1 wherein said warp control means changes said ratio accroding to weight balance of the vehicle body member.

5. The suspension system accroding to claim 1 wherein under normal conditions said warp control means changes said ratio according to the weight balance of the vehicle body member, and further changes said ratio so as to be decreased accroding to the increase in the lateral acceleration.

* * * * *